US008628415B2

(12) United States Patent
Johnson et al.

(10) Patent No.: US 8,628,415 B2
(45) Date of Patent: Jan. 14, 2014

(54) WAGERING GAME WITH 3D GAMING ENVIRONMENT USING DYNAMIC CAMERA

(75) Inventors: Kevin Johnson, Oak Park, IL (US); John Walsh, Grunee, IL (US)

(73) Assignee: WMS Gaming Inc., Waukegan, IL (US)

( * ) Notice: Subject to any disclaimer, the term of this patent is extended or adjusted under 35 U.S.C. 154(b) by 742 days.

(21) Appl. No.: 12/513,105

(22) PCT Filed: Nov. 5, 2007

(86) PCT No.: PCT/US2007/023259

§ 371 (c)(1),
(2), (4) Date: Feb. 25, 2010

(87) PCT Pub. No.: WO2008/063390

PCT Pub. Date: May 29, 2008

(65) Prior Publication Data

US 2010/0151943 A1 Jun. 17, 2010

Related U.S. Application Data

(60) Provisional application No. 60/858,114, filed on Nov. 9, 2006.

(51) Int. Cl.
*A63F 9/24* (2006.01)
*G06F 17/00* (2006.01)

(52) U.S. Cl.
USPC .................. 463/32; 463/33; 463/42; 348/170

(58) Field of Classification Search
None
See application file for complete search history.

(56) References Cited

U.S. PATENT DOCUMENTS

| | | | | |
|---|---|---|---|---|
| 5,610,653 | A * | 3/1997 | Abecassis | 348/170 |
| 6,155,926 | A * | 12/2000 | Miyamoto et al. | 463/32 |
| 6,196,919 | B1 * | 3/2001 | Okubo | 463/32 |
| 6,217,446 | B1 * | 4/2001 | Sanbongi et al. | 463/7 |
| 6,234,901 | B1 * | 5/2001 | Nagoshi et al. | 463/33 |
| 6,259,431 | B1 * | 7/2001 | Futatsugi et al. | 345/157 |
| 6,283,857 | B1 * | 9/2001 | Miyamoto et al. | 463/31 |
| 6,304,267 | B1 * | 10/2001 | Sata | 345/427 |
| 6,402,615 | B1 * | 6/2002 | Takeuchi | 463/31 |
| 6,491,585 | B1 * | 12/2002 | Miyamoto et al. | 463/33 |
| 6,685,560 | B1 * | 2/2004 | Hughes | 463/16 |
| 6,887,157 | B2 * | 5/2005 | LeMay et al. | 463/32 |
| 7,128,647 | B2 * | 10/2006 | Muir | 463/20 |
| 7,806,767 | B2 * | 10/2010 | Kitao | 463/31 |
| 8,339,364 | B2 * | 12/2012 | Takeda et al. | 345/158 |
| 2003/0040362 | A1 * | 2/2003 | Egashira | 463/42 |
| 2003/0100364 | A1 * | 5/2003 | Mori | 463/30 |
| 2003/0100366 | A1 * | 5/2003 | Nagase | 463/33 |
| 2004/0023718 | A1 * | 2/2004 | Kondo et al. | 463/30 |

(Continued)

OTHER PUBLICATIONS

WMS Monopoly Grand Hotel screen shots, Aug. 14, 2009, 7 pages.*

(Continued)

*Primary Examiner* — Paul A D'Agostino
(74) *Attorney, Agent, or Firm* — Nixon Peabody LLP

(57) ABSTRACT

A gaming system for playing a wagering game includes an input device for receiving a wager to play a wagering game, a display, and a controller. The controller is configured to display a three-dimensional view of at least a portion of a gaming environment and one or more movable visual elements disposed within the gaming environment. The controller is further configured to dynamically retain within the field of view a center point of a selected set of the movable visual elements.

23 Claims, 10 Drawing Sheets

(56) References Cited

U.S. PATENT DOCUMENTS

| | | | | |
|---|---|---|---|---|
| 2004/0063501 | A1* | 4/2004 | Shimokawa et al. | 463/49 |
| 2004/0176164 | A1* | 9/2004 | Kobayashi | 463/30 |
| 2004/0192424 | A1* | 9/2004 | Mori et al. | 463/8 |
| 2004/0209684 | A1* | 10/2004 | Hisano | 463/32 |
| 2005/0049029 | A1* | 3/2005 | Gazdic et al. | 463/20 |
| 2005/0049047 | A1* | 3/2005 | Kitao | 463/33 |
| 2005/0068313 | A1* | 3/2005 | Morimitsu et al. | 345/419 |
| 2005/0187015 | A1* | 8/2005 | Suzuki et al. | 463/32 |
| 2005/0237323 | A1* | 10/2005 | Shimamura et al. | 345/419 |
| 2005/0266921 | A1* | 12/2005 | Hayashida et al. | 463/33 |
| 2006/0007312 | A1* | 1/2006 | James | 348/169 |
| 2006/0094503 | A1* | 5/2006 | Ajioka et al. | 463/32 |
| 2006/0154721 | A1* | 7/2006 | Okuniewicz | 463/25 |
| 2006/0178213 | A1* | 8/2006 | Ohta et al. | 463/37 |
| 2006/0189378 | A1* | 8/2006 | Aoki | 463/20 |
| 2006/0240885 | A1* | 10/2006 | Thomas et al. | 463/12 |
| 2007/0077994 | A1* | 4/2007 | Betteridge | 463/42 |
| 2007/0270215 | A1* | 11/2007 | Miyamoto et al. | 463/32 |
| 2009/0104992 | A1* | 4/2009 | Kouno | 463/36 |
| 2009/0131167 | A1* | 5/2009 | Kawabata | 463/32 |

OTHER PUBLICATIONS

WMS Gaming website hosting Monopoly Grand Hotel Mar. 21, 2006, 3 pages.*

WMS § $4^{th}$ QTR result call, Aug. 9, 2004, 23 pages.*

WMS Press Release WMS Gaming to Debut New Gaming Platform at G2E in Las Vegas, Sep. 11, 2003, 4 pages.*

WMS Press Release WMS Gaming and Hasbro Extend License Agreement for Monopoly, Sep. 16, 2003, 2 pages.*

International Search Report, PCT Application No. PCT/US2007/023259, 1 page, dated Apr. 24, 2008.

Written Opinion PCT Application No. PCT/US2007/023259, 5 pages, dated Apr. 24, 2008.

* cited by examiner

WAGERING GAME WITH 3D GAMING ENVIRONMENT USING DYNAMIC CAMERA

CLAIM OF PRIORITY AND CROSS-REFERENCE TO RELATED APPLICATIONS

This application is a U.S. National Phase of International Application No. PCT/US2007/023259, filed on Nov. 5, 2007, which claims the benefit of and priority to U.S. Provisional Patent Application No. 60/858,114, filed on Nov. 9, 2006, the contents of both of which are hereby incorporated by reference in their entireties.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present concepts relate generally to gaming machines, and methods for playing wagering games, and more particularly, to a wagering game having a dynamic camera display feature.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

Many current wagering games include a display generally displaying a broad view of the game with numerous, small game elements (e.g., characters, graphics, or the like) of the game thereon. This type of view may be desirable to allow the player to view the entire gaming environment. For example, all of a plurality of player-selectable elements may be shown simultaneously to a player. One drawback, however, to displaying only a broad view of the game is that the individual game elements must be relatively small for all of the elements to fit on the display. Because of their small size, many game elements of current wagering games lack substantial detail. This lack of detail may cause the game elements to look "generic." Thus, the player's anticipation and excitement may be limited, thereby decreasing the ability of the wagering game to draw the player into the game. Further, such views of the entire gaming environment are generally static views that, over time, may seem stale to frequent players.

Therefore, there is a need for a wagering game to improve the available views of the elements of the wagering game.

SUMMARY OF THE INVENTION

According to one aspect of the present invention, a gaming system for playing a wagering game includes an input device for receiving a wager to play a wagering game, a display, and a controller. The controller is configured to display a three-dimensional view of at least a portion of a gaming environment and one or more movable visual elements disposed within the gaming environment. The controller is further configured to dynamically retain within the field of view a center point of a selected set of the movable visual elements.

According to another aspect of the invention, a method of conducting a wagering game on a gaming system comprises the act of positioning a virtual camera at a first point within a gaming environment to provide a first three-dimensional view of one or more movable visual elements in the gaming environment at a first point in time. The further includes the acts of randomly determining a position of a movable visual element at a second point in time and moving the movable visual element toward the position. The act also includes repositioning a view point of the camera to a second view point within the gaming environment to provide a second three-dimensional view of the one or more movable visual elements preceding, concurrent with, or following a movement of at least one movable visual element. The repositioning of the camera to the second point comprises moving the camera from the first point to the second point while at least substantially maintaining a view of the one or more movable visual elements.

According to yet another aspect of the invention, a computer readable storage medium is encoded with instructions for directing a gaming system to perform the above method.

According to yet another aspect of the invention, a gaming system comprises an input device for receiving a wager to play a wagering game and at least one display for displaying a gaming environment. The gaming environment comprises a path including a plurality of stations and one or more visual elements moving in relation to the gaming environment. The display is adapted to display a three-dimensional view of the gaming environment from a camera positioned at a dynamically selected view point, the dynamically selected view point being determined by a controller to retain within a field of view of the camera view a center point of the moving visual elements.

Additional aspects of the present concepts will be apparent to those of ordinary skill in the art in view of the detailed description of various aspects and embodiments, which is made with reference to the drawings, a brief description of which is provided below.

DETAILED DESCRIPTION

Figure 1A:
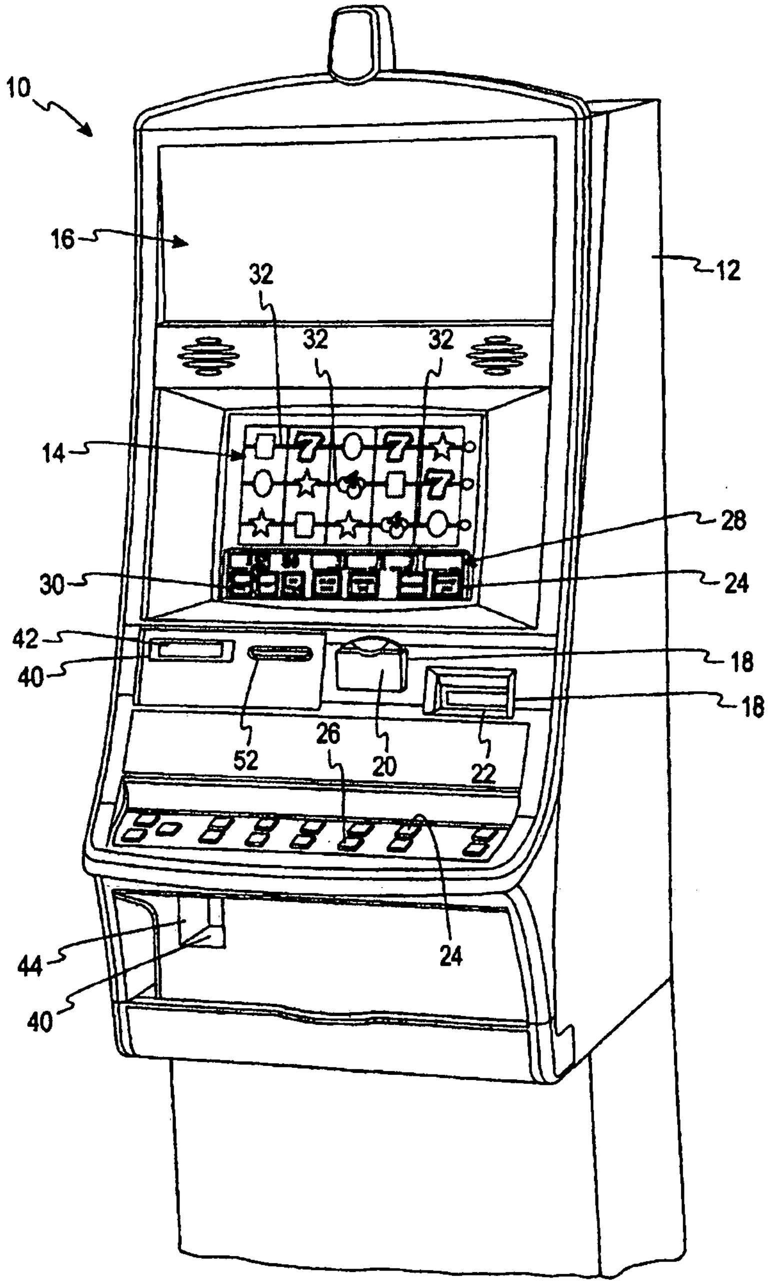
FIG. 1*a* is a perspective view of a free standing gaming machine embodying the present concepts.

While the present concepts are susceptible of embodiment in many different forms, there is shown in the drawings and will herein be described in detail preferred embodiments of the present concepts with the understanding that the present disclosure is to be considered as an exemplification of the principles of the present concepts and is not intended to limit the broad aspect of the present concepts to the embodiments illustrated.

Referring to FIG. 1*a*, a gaming machine 10 is used in gaming establishments such as casinos. With regard to the present concepts, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
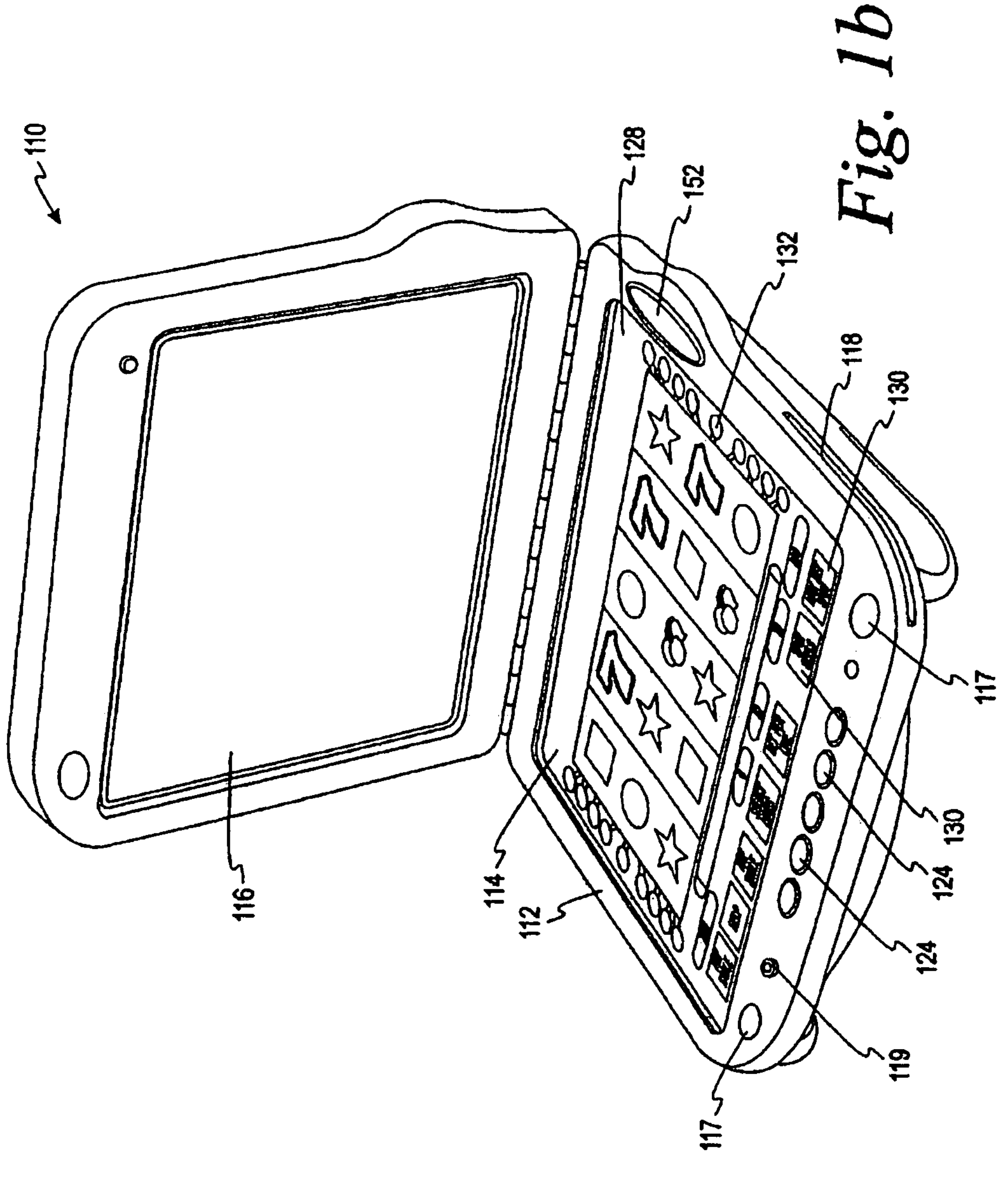
FIG. 1*b* is a perspective view of a handheld gaming machine embodying the present concepts.

Depicted in FIG. 1*b* is a handheld or mobile gaming machine 110. Like the free standing gaming machine 10, the handheld gaming machine 110 is preferably an electronic gaming machine configured to play a video casino game such as, but not limited to, blackjack, slots, keno, poker, blackjack, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen 128 mounted to a primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen 128 at an appropriate touch key 130 or by pressing an appropriate push button 126 on the button panel. The touch keys 130 may be used to implement the same functions as push buttons 126. Alternatively, the push buttons may provide inputs for one aspect of the operating the game, while the touch keys 130 may allow for input needed for another aspect of the game. The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1*b*, comprises a biometric sensing device.

Figure 2:
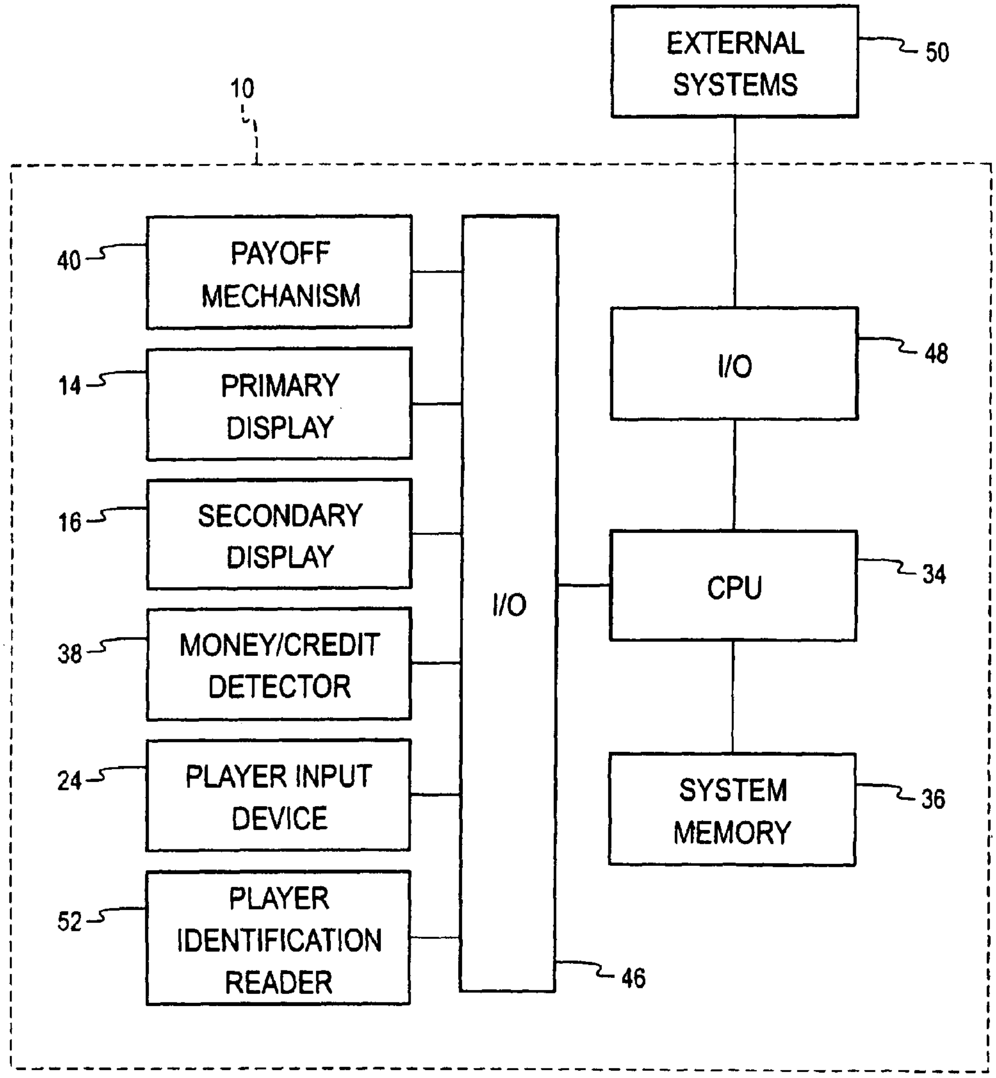
FIG. 2 is a block diagram of a control system suitable for operating the gaming machines of FIGS. 1*a* and 1*b;*

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1*a*, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10,110 may communicate with external systems 50 (in a wired or wireless manner) such that each machine operates as a "thin client," having relatively less functionality, a "thick client," having relatively more functionality, or through any range of functionality therebetween (e.g., a "rich client"). As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "rich client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

Embodiments of the present concepts are described below with reference to FIGS. 3-9. Generally, the present concepts relate to a viewing feature (e.g., a virtual camera) implemented during a basic wagering game and/or during a bonus game to provide a dynamic, real-time view. FIGS. 4-9 show an implementation of the viewing feature in a Monopoly®-themed 3-D bonus game wherein the viewing feature provides the player with a dynamic perspective of a gaming environment comprising a Monopoly board 178. In this example, the dynamic perspective of the virtual camera is influenced by the real-time actions of movable visual elements 200 within the 3-D gaming environment.

As described in greater detail below, the viewing feature operates, in at least some aspects, by tracking movable visual elements 200 within the 3-D gaming environment and determining a position or determining a preferred position (e.g., from one or more suitable positions) from which to view all of the moveable visual elements 200, or a selected subgroup thereof, in relation to other objects in the 3-D gaming environment. Thus, a view point, or a point in space representing a viewing position, moves through the 3-D gaming environment responsive to movement of one or more of the movable visual elements 200. As used herein, the term 3-D gaming environment includes any type of 3-D representation, but the illustrative examples provided herein relate particularly to 3-D perspective projection wherein three dimensional points are transformed via one or more transformation matrices for projection onto a view window of a two-dimensional plane (i.e., the view plane or view screen).

A gaming system in accord with the present concepts includes an input device for receiving a wager to play a wagering game and a primary display 14 and/or secondary display 16, as previously noted. The gaming system also includes, as will be appreciated from the examples of FIGS. 4-9, a controller (e.g., 34) configured to display on the display(s) 14 and/or 16, or even an area display, a three-dimensional field of view representing the view from a point of view or virtual "camera." This three-dimensional field of view comprises a portion of or an entirety of a three-dimensional gaming environment and one or more movable visual elements 200 disposed within the three-dimensional gaming environment. The examples of FIGS. 4-9 include a three-dimensional gaming environment which comprises a board-game (e.g., a MONOPOLY®-themed game) upon which the movable visual elements 200 (e.g., representations of people) are disposed and move. In accord with aspects of the present concepts, the controller (e.g., 34 of FIG. 2) is configured to move the three-dimensional field of view (e.g., moving the point of view or virtual camera) from one position in the three-dimensional gaming environment to another position in the three-dimensional gaming environment while retaining a selected movable visual elements 200 or selected movable visual elements within the three-dimensional field of view.

The gaming environment and moveable visual elements are generated in real-time using a 3-D game engine (e.g., game middleware) and/or 3-D engine (e.g., graphics engine, rendering engine) such as, but not limited to RenderWare®, developed and maintained by Criterion Software, inclusive of any publicly available free or open-source engines and commercial engines (e.g., Unigine, Power Render, Dagor Engine 3, etc., or any other game engine currently existing or later developed). The concepts presented herein do not depend upon any particular application programming interface (API). The term "game engine" is used herein, for brevity, to refer to both or either of a 3-D game engine and/or a 3-D engine. The present concepts may also advantageously include a physics engine, whether separately or as part of a game engine, to realistically animate physical objects within the gaming environment.

Figure 3:
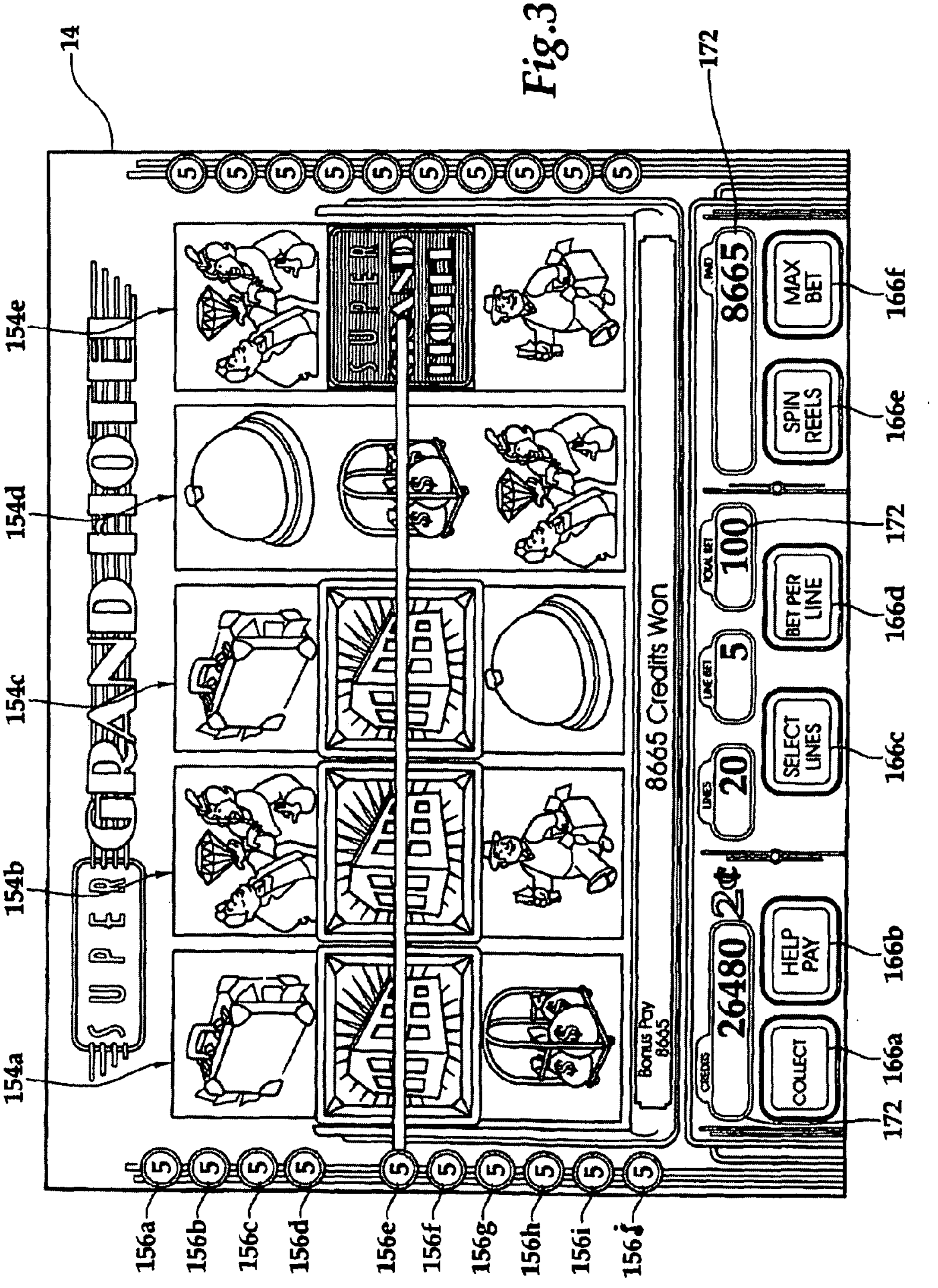
FIG. 3 is a display of a basic game screen.

Turning now to FIG. 3, a basic game is implemented on the primary display 14. In this embodiment, the basic game is a slot machine game, with symbols on five different reels 154*a*, 154*b*, 154*c*, 154*d*, 154*e*. The reels 154*a-e* may be traditional mechanical reels, electromechanical reels, or computer-generated images of reels, or an array of computer-generated images having the semblance of a reel, with each reel having a plurality of symbols thereon and/or each array position having a symbol thereon. In the illustrated embodiment, there are multiple pay lines shown by the pay line indicators 156*a-j* across the various reels 154*a-e*. While multiple pay lines are shown, a gaming terminal 10 with a single pay line may also be used with the present concepts. An outcome indicator 172 indicates whether the outcome has resulted in a payout, a progressive jackpot, a bonus game, or whether it resulted in no reward at all.

In the illustrated example, various combinations of symbols, either along active pay lines or in predefined cell locations, patterns, or quantities, may indicate prizes including monetary and non-monetary prizes. The non-monetary prizes include free spins, multipliers, entry into a bonus game, entry into a progressive game, or the like.

During the basic game of the illustrated embodiment of FIG. 3, the player places a wager on any number of pay lines, as denoted by the pay line indicators 156*a-j*. For example, in one embodiment, the wager may be between one and five credits per pay line. However, in other embodiments, other wager amounts may be made. Once the player has input the wager and activated a "spin reels" button 166*e*, or the like, the reels 154*a-e* begin to spin. Likewise, for a symbol array, the symbols in the symbol array are caused by the controller to assume an intermediate state in which the symbol outcome for the array positions are visually indeterminable. As illustrated in FIG. 3, near the bottom of the display 14 are a plurality of keys 166*a-f* that enable the player to perform various functions, such as select the pay lines to play, select a wager amount, and spin the reels 154*a-e*. Information relating to the spin outcome or symbol array outcome is displayed on one or more outcome indicators 172 located above the keys 166*a-f*. For example, the outcome indicator 172 may provide the player with information such as the amount of the current wager, the amount awarded, the total number of credits remaining, and the like. Winning pay lines may be highlighted on the primary display 14.

In the illustrated example of FIG. 3, the player has made a wager, and the reels 154*a-e* have spun or the symbol array resembling a reel has been updated to reflect the randomly determined outcome. In this embodiment, a pay line corresponding with the pay line indicator 156*c* traverses the top symbols of the reels 154*a-e*. At the conclusion of the reel spin depicted in FIG. 3, the pay line 156*e* includes three "GRAND HOTEL" symbols, creating a winning symbol combination. The player is awarded an initial basic game payout according to a basic game pay table, as shown on the outcome indicator 172. The pay table for the basic game indicates the possible winning combinations of symbols and the initial payout associated with each winning combination prior to any bonus events. For line pays (i.e., winning combinations that must appear on an active pay line), the payout is typically, but not necessarily, multiplied by the number of credits wagered on the winning pay line. For scatter pays (i.e., winning combinations that must appear on the display in a predetermined configuration but need not appear on an active pay line), the payout may be multiplied by the total number of credits wagered.

In many traditional gaming machines, the basic game concludes following the stopping of the reels, the evaluation of the winning combinations, and the payment of awards. Other gaming machines may award a bonus game during which the player may be awarded a bonus prize. A bonus game is triggered when a special "start bonus" outcome occurs in the basic game. The bonus game may be displayed on the primary display 14, the secondary display 16, or both. For example, in FIG. 3, a winning combination of three or more hotel-related symbols appearing on an active pay line 156*a-i* during the basic game triggers a bonus game.

Figure 4:
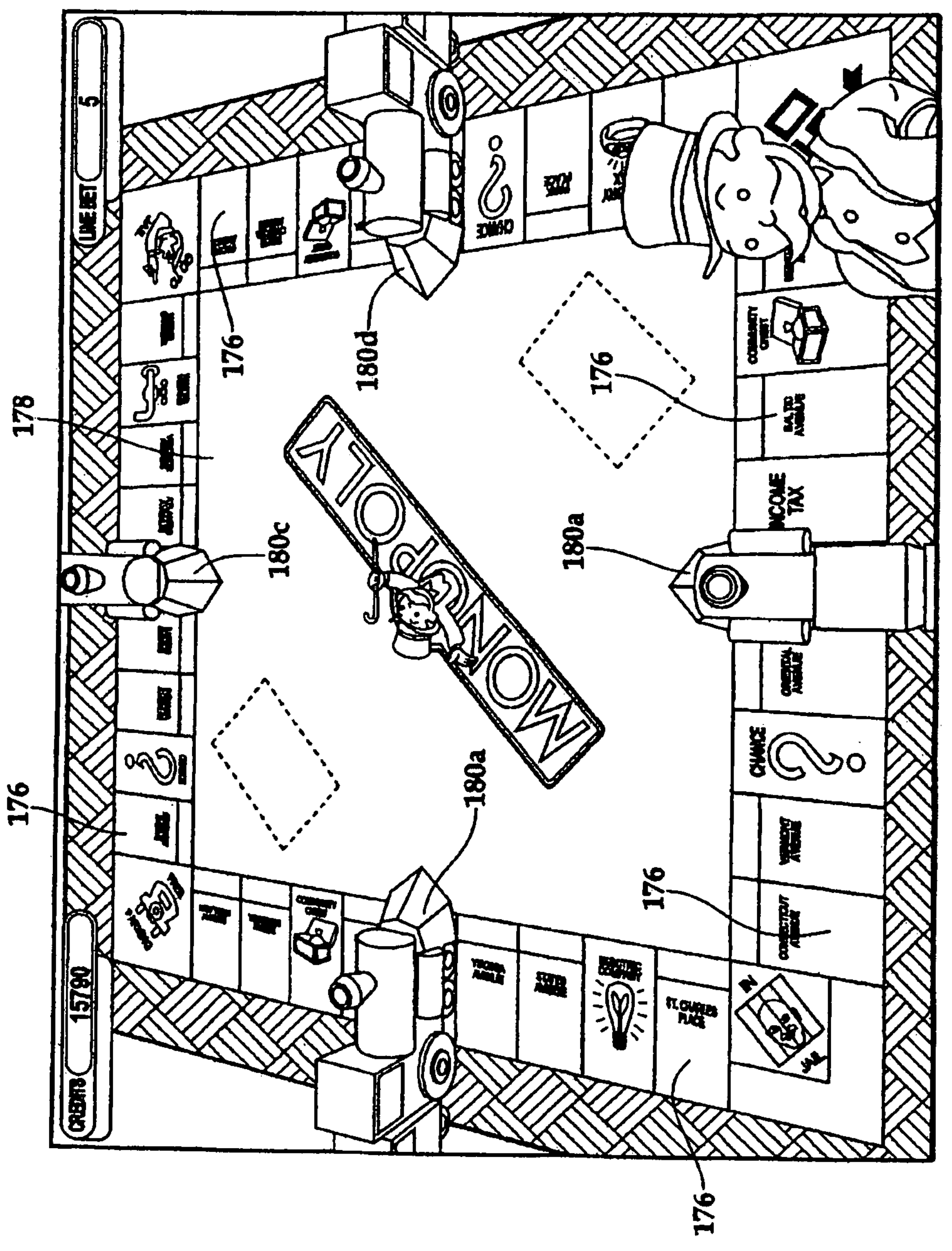
FIG. 4 is a display of a screen according to an aspect of an embodiment of the present concepts.

FIG. 4 illustrates a bonus game displayed on a secondary display 16 according to aspects of one embodiment of the present concepts. The bonus game may also or alternatively be displayed on the primary display 14 and/or an area display (not shown). The bonus game represented in FIG. 4 depicts, as one possible example of a gaming environment, a board-game (i.e., MONOPOLY®). The board-game defines a plurality of stations or squares 176 located on a game board 178. The stations 176 include properties (e.g., "BOARDWALK," "PARK PLACE," etc.), CHANCE, COMMUNITY CHEST, GO TO JAIL, and the like, in accord with the MONOPOLY® theme.

In FIG. 4, four trains 180*a*-180*d* are shown on the railroad stations (i.e., "READING RAILROAD," "PENNSYLVANIA RAILROAD," "B&O RAILROAD," and "SHORT LINE RAILROAD," respectively). The player is then prompted to select one of the trains 180*a*-180*d* to determine the number of moveable visual elements that will populate the gaming environment. Each of the trains 180*a*-180*d* is randomly associated with either a predetermined number of moveable visual elements 200, shown by way of example in FIGS. 5-9, or a random number of such moveable visual elements. Following selection of one of the trains 180*a*-180*d*, the selected train, train 180*d* as shown, is optionally highlighted and the moveable visual elements 200 are shown (see FIG. 5).

Figure 5:
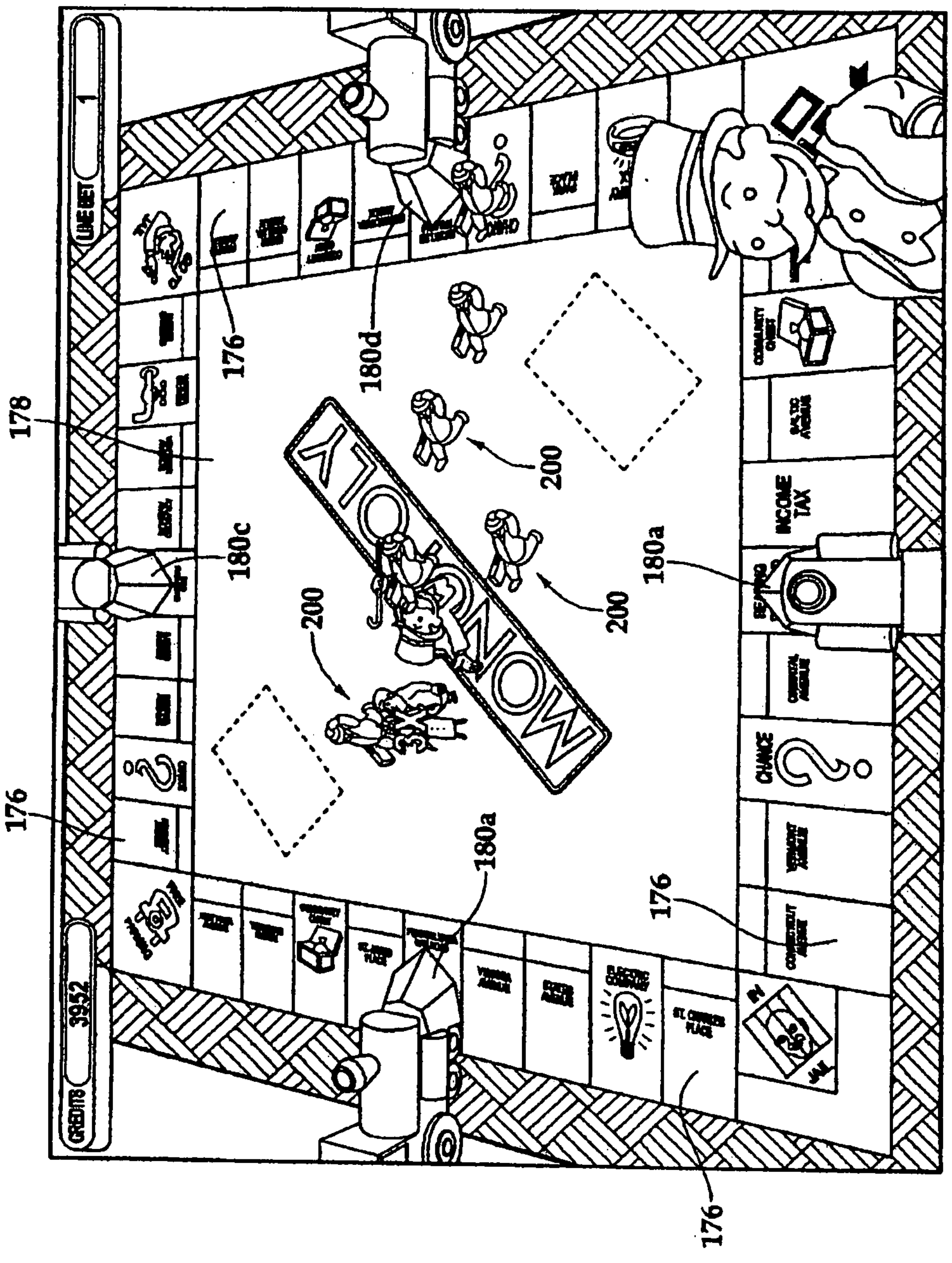
FIG. 5 is a display of a screen according to an aspect of an embodiment of the present concepts.

As shown in the example of FIG. 5, the moveable visual elements 200 comprise people moving out of the train and onto the central portion of the game board 178. Alternatively, the moveable visual elements 200 may be disposed outside of the game board 178 or in some relation to the game board (or other gaming environment) other than that depicted. In FIG. 5, the camera is positioned to include all of the movable visual elements 200 and substantially the entire game board 178 within the view frustrum. In this example, at least initially, the view point of the camera will be centered about the center point of all position vectors of the movable visual elements 200. In this manner, all of the movable visual elements 200 will remain within the field of view of the camera at all times.

Figure 7:
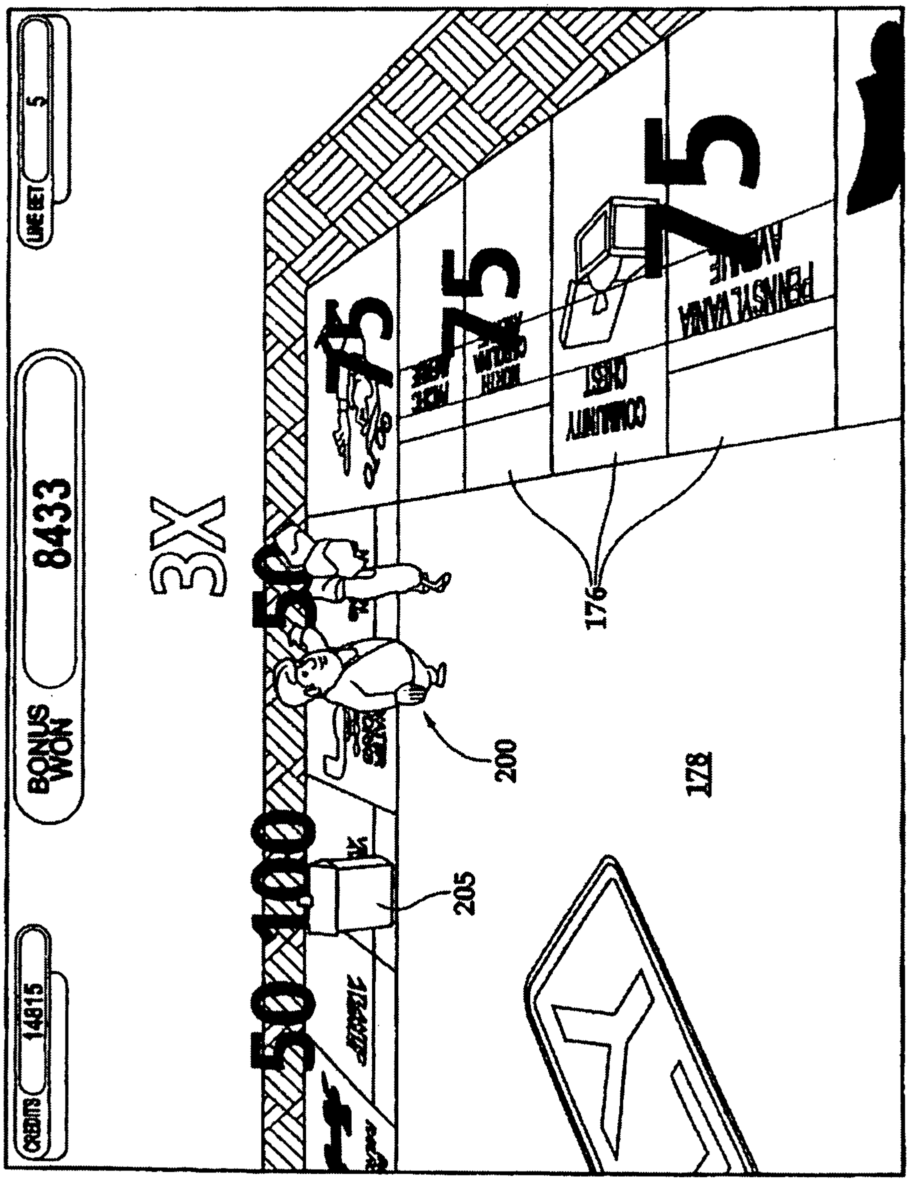
FIG. 7 is a display of a screen according to an aspect of an embodiment of the present concepts.

The moveable visual elements 200 (e.g., people) may look alike, or may embody various unique appearances, attributes, behaviors, and/or characteristics. Where provided, such unique appearances, attributes, behaviors, and/or characteristics may optionally denote a particular predilection for certain properties or outcomes. For example, moveable visual elements 200 provided to have the appearance of a "Rich Couple," such as shown in FIG. 7, may optionally have a greater probability of being associated with a higher value winning outcome in the bonus game than a "Salesman."

Figure 6:
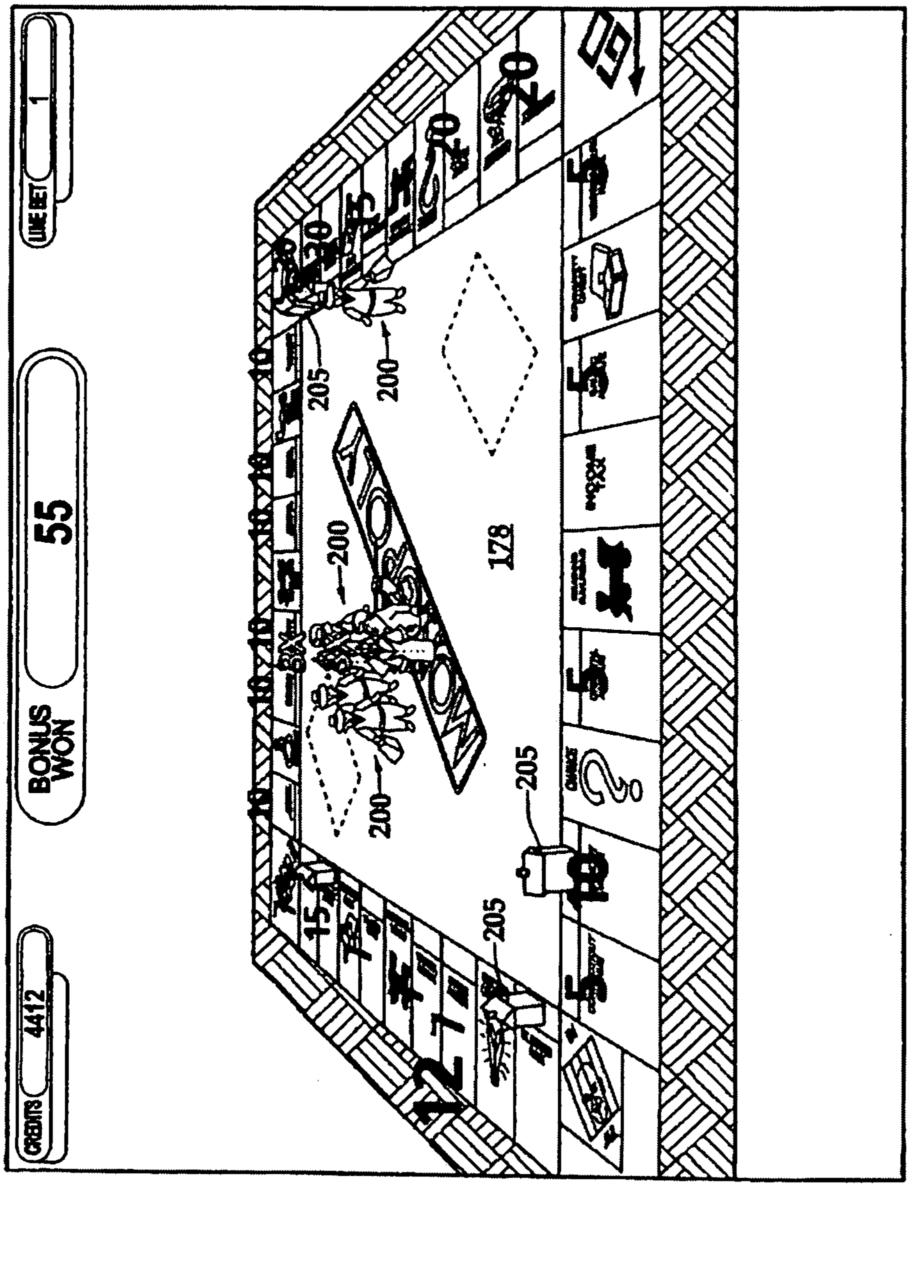
FIG. 6 is a display of a screen according to an aspect of an embodiment of the present concepts.

FIG. 6 shows that nine moveable visual elements 200 (hereinafter "virtual people 200" or "virtual person 200" for brevity) have disembarked from the train 180*d* onto the game board 178. The virtual people 200 congregate within a central portion of the game board 178 within the inner perimeter defined by the inside border of the stations 176. The virtual people 200 move about the central portion of the game board 178, mill about, look around, engage in mannerisms consistent with the persona of the specific virtual people, and ultimately, approach a station 176 that they are destined to occupy or engage. The particular station 176 that each individual virtual person 200 is to occupy or engage is preferably determined at random, although other determination methods may optionally be employed that deviate from a purely random outcome. For example, the designated station 176 for a given virtual person 200 could be a random outcome influenced by a factor such as, but not limited to, wagers placed during game play (e.g., max bet).

FIG. 6 shows a different screen wherein five virtual people 200 are shown, three "Salesmen" and two "Rich Couples." The "Rich Couples" are treated in this example as a single virtual person in terms of unity of action regarding a station 176 (i.e., they select the same station and generally act as a unit). In FIG. 6, each of the two "Rich Couples" has a "3×" multiplier disposed thereover. Thus, in accord with at least this example, the bonus awarded when the "Rich Couples" occupy or engage a station 176 will be multiplied by three times.

On the left side of the screen shown in FIG. 6, a highlighted "12" is shown above "ST. CHARLES PLACE," which indicates that a virtual person (not shown) has just occupied or engaged that station 176. Following the occupation of the station 176, the virtual person (not shown) disappears and is replaced by the bonus award for that station. In this example, "ST. CHARLES PLACE" has a base value of 7 credits, similar to "STATES AVENUE" and "VIRGINIA AVENUE." However, since "ST. CHARLES PLACE" has a house 205 on the station 176, the base value is increased to 12 credits. Similarly, it can be seen in this example that "VERMONT AVENUE," "TENNESSEE AVENUE," "PACIFIC AVENUE," and "NORTH CAROLINA AVENUE" also have houses 205 and carry with them enhanced bonus values of 10 credits, 15 credits, 30 credits, and 30 credits, respectively, as compared to the displayed base values of the related stations of 5 credits, 7 credits, 15 credits, and 15 credits, respectively.

In FIG. 6, the view point of the camera remains centered about the center point of all position vectors of the movable visual elements 200 so that all of the movable visual elements 200 will remain within the field of view of the camera at all times. However, in this screen shot, the camera has been moved to a different view point than that represented in FIG. 5.

FIG. 7 shows a close-up view of a "Rich Couple" 200. As in FIG. 6, the "Rich Couple" 200 has a "3×" multiplier disposed thereover. In this case, however, the station 176 values are higher than that shown in FIG. 6. The stations 176 of "PACIFIC AVENUE," "NORTH CAROLINA AVENUE," and "PENNSYLVANIA AVENUE" are shown, without houses, to have a base value of 75 credits. Neighboring stations of "MARVIN GARDENS," "VENTNOR AVENUE," and "ATLANTIC AVENUE" are shown to have a base value of 50 credits, with "VENTNOR AVENUE" having an enhanced value of 100 credits owing to the house 205 thereon. At the instant shown, the woman of the "Rich Couple" is peering over to "PACIFIC AVENUE" and might move the pair to occupy or engage "PACIFIC AVENUE," or might move on to another station 176.

In FIG. 7, the view point of the camera is no longer centered about the center point of all position vectors of the movable visual elements 200. Instead, the view point of the camera is centered about the center point of position vectors for a subset of movable visual elements 200, here the "Rich Couple." Accordingly, this subset will remain within the center of the field of view of the camera.

Figure 8:
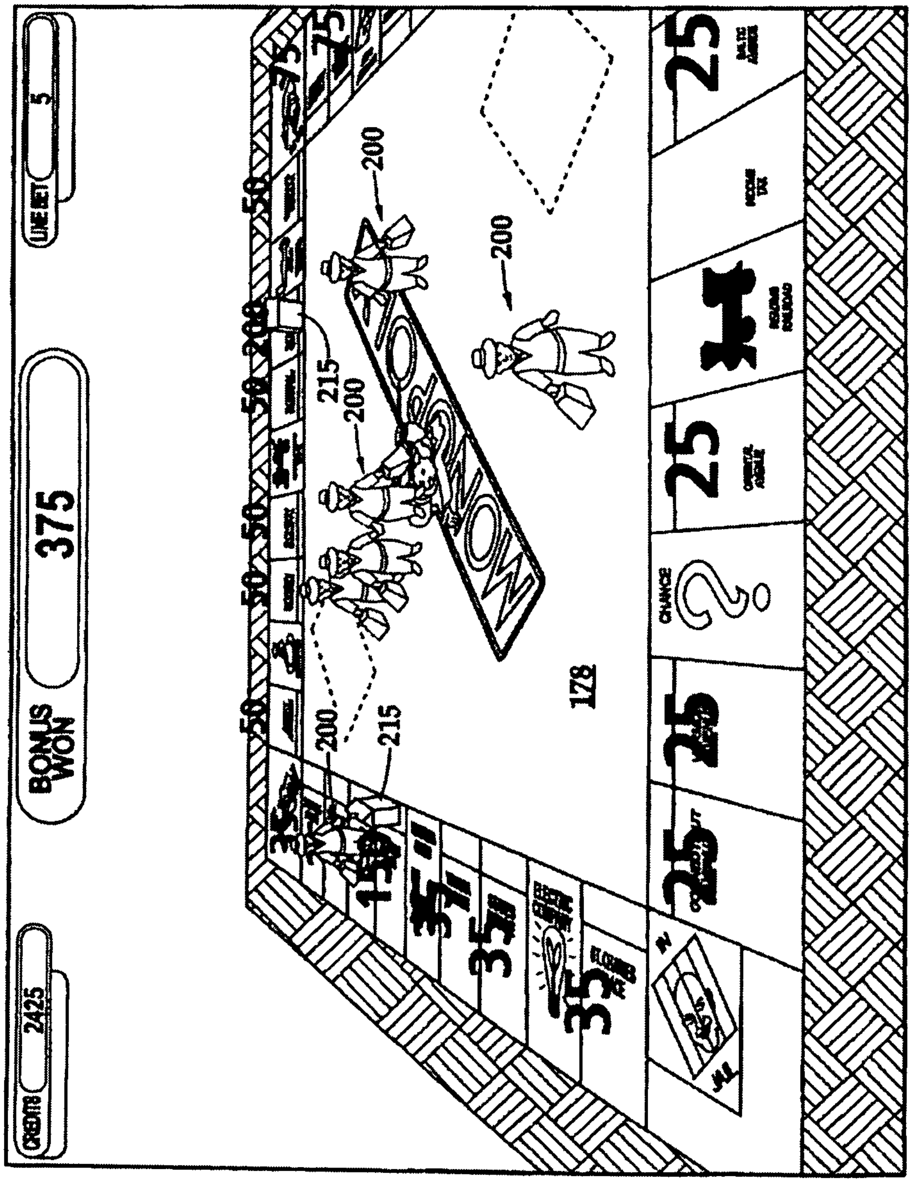
FIG. 8 is a display of a screen according to an aspect of an embodiment of the present concepts.

FIG. 8 shows another screen wherein six "Salesmen" 200 are shown. A substantial portion of the game board 178 is also shown. In FIG. 8, five of the "Salesmen" 200 are shown in a central portion of the game board 178, whereas one of the "Salesmen" has ventured onto the "COMMUNITY CHEST" station 176 adjacent "ST. JAMES PLACE." In this example, it can be seen that hotels 215 are provided on "ST. JAMES PLACE" and "VENTNOR AVENUE" to provide an enhanced value of 150 credits and 200 credits therefor. In FIG. 8, the view point of the camera is centered about the center point of all position vectors of the movable visual elements 200 so that all of the movable visual elements 200 will remain within the field of view of the camera at all times. In this screen shot, the camera is positioned at a view point which clips a portion of the right side of the game board 178, as shown.

Figure 9:
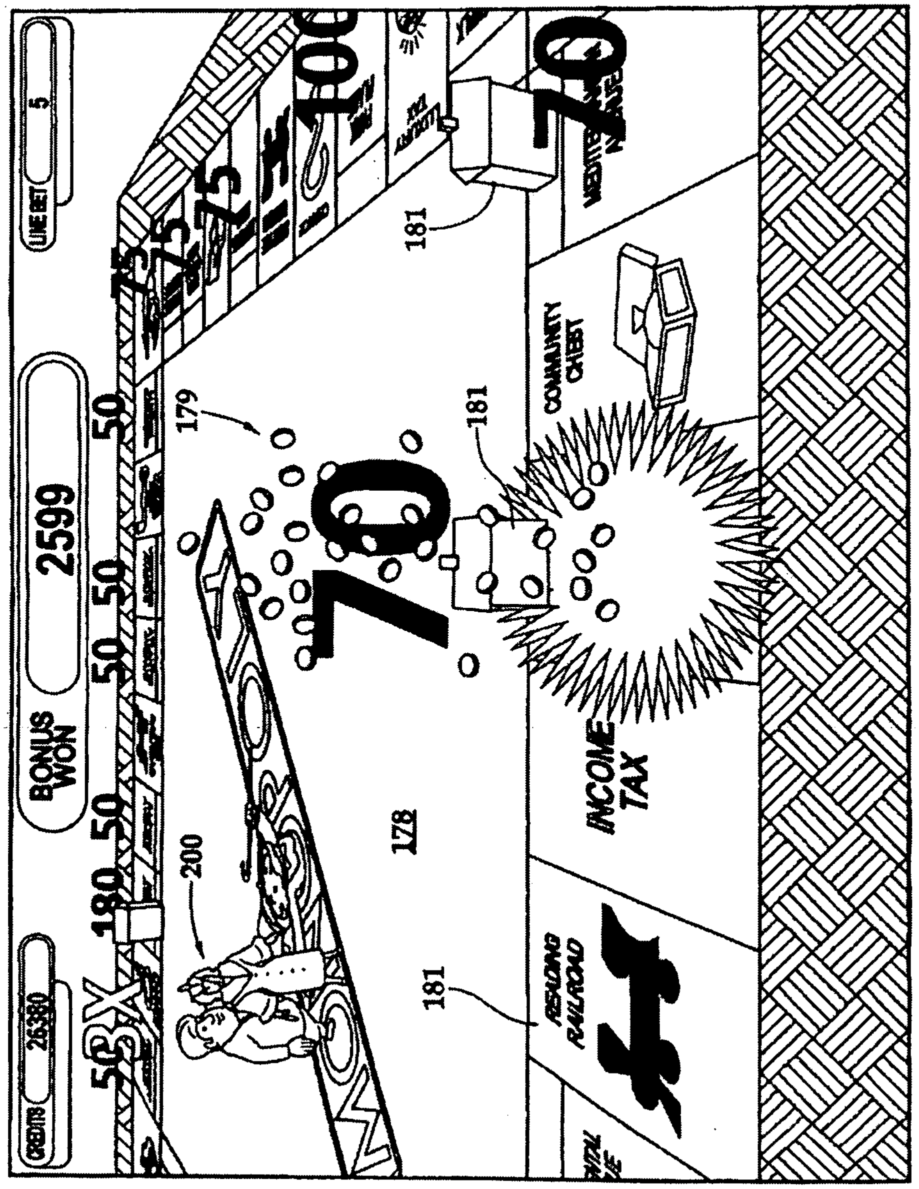
FIG. 9 is a display of a screen according to an aspect of an embodiment of the present concepts.

FIG. 9 shows another screen wherein a "Rich Couple" 200 is shown near a central portion of the game board 178. More than half of the game board 178 is shown. At the front of the screen shown in FIG. 9, a bonus award indicator 179, shows an a highlighted "70" above the "BALTIC AVENUE" station 176, which has a hotel 181 thereon, together with a display of numerous gold coins showering down on the station. These graphics indicate that a virtual person 200 has just occupied or engaged the "BALTIC AVENUE" station 176, such action causing the displayed bonus to be revealed. In FIG. 9, the view point of the camera is centered, at the depicted instant of time, at the position vector corresponding to the single movable visual element 200 (not shown) moved to occupy or engage the "BALTIC AVENUE" station 176. At the instant shown, the camera remains at the view point until such time as the displayed bonus graphics entirely or substantially end, at which time the controller will determine a new view point based on the positions of the remaining movable visual elements 200.

In at least some aspects, the three-dimensional field of view comprises a dynamic point of view or camera positioned by the controller (e.g., 34 of FIG. 2) to maintain a set of static objects, such as portions of the board-game, and dynamic objects, such as the movable visual elements 200, in the view frustrum or view volume of the camera. The position of each dynamic object within the three-dimensional gaming environment is defined at any given point in time by a direction vector having a magnitude and directional components of a defined reference frame or coordinate system (e.g., cartesian, polar, spherical, etc.). In at least some aspects, the defined reference frame and coordinate system may be centered with respect to an arbitrarily disposed center point or origin in the three-dimensional gaming environment such as, but not limited to, a center point or corner of the board-game in the depicted example. The position of each movable visual element 200 is then accordingly defined by a vector from the origin to the movable visual element. In at least some other aspects, the defined reference frame or coordinate system may be centered with respect to the view point or camera wherein, for example, the position of each movable visual element 200 is defined by a vector from the view point or camera to the movable visual element. Alternatively, a plurality of reference frames may be selected and utilized to simplify and/or speed processing speed.

Regardless of the selected reference frame, conversions of the vector equations from one reference frame to another reference frame may be accomplished using a transformation matrix, in a manner well-known to those having ordinary skill in the art. For example, transformation of a vector (e.g., $A=iA_x+jA_y+kA_z$) from a first reference frame into a second reference frame (e.g., $A=i'A_{x'}, +j'A_{y'}, +k'A_{z'}$) would be handled by such a transformation matrix. Conventional transformation matrices and vector algebra may accordingly be used in a situation utilizing a fixed origin to effect rotation, scaling, shearing, reflection, and/or orthogonal projection.

A first step in transforming the coordinates of each point of a given movable visual element 200 typically, but not necessarily, comprises representing the position and orientation of each point of the movable visual element. Each point is a set of three numbers (e.g., x, y, z, coordinates) from an origin (an origin of the object or movable visual element that the points belong to). In addition, the object or movable visual element has three coordinates and a rotation (e.g., α, β, γ) describing its position and orientation relative to a gaming environment or "world" reference frame. Separate transformation matrices may separately handle translation, rotation about the x-axis, rotation about the y-axis, and rotation about the z-axis, the product of these matrices yielding a gaming environment matrix, which may further be multiplied by a scaling transformation matrix, such as:

$$\begin{bmatrix} s_x\cos\gamma\cos\beta & -s_y\sin\gamma\cos\beta & s_z\sin\beta & x \\ s_x\cos\gamma\sin\beta\sin\alpha + s_x\sin\gamma\cos\alpha & s_y\cos\gamma\cos\alpha - s_y\sin\gamma\sin\beta\sin\alpha & -s_z\cos\beta\sin\alpha & y \\ s_x\sin\gamma\sin\alpha - s_x\cos\gamma\sin\beta\cos\alpha & s_y\sin\gamma\sin\beta\cos\alpha + s_y\sin\alpha\cos\gamma & s_z\cos\beta\cos\alpha & z \\ 0 & 0 & 0 & 1 \end{bmatrix}$$

The order of the matrix multiplications may be selectively varied and, for example, scaling may be applied separately with respect to the individual axes, rather than against the world transform matrix.

The next act is substantially identical to the above act, but uses the coordinates of the observer instead of the coordinates of a point of an object, and the inverses of the matrices (e.g., inverse object translation, inverse rotation about the x-axis, inverse rotation about the y-axis, inverse rotation about the z-axis) should be used, multiplied in the opposite order. The resulting transformation matrix can transform coordinates from the gaming environment reference frame to the camera's reference frame. In at least some aspects, the camera reference frame looks along its z-axis, the x-axis is left, and the y-axis is up. The aforementioned transformation matrices can be multiplied to yield a matrix able to transform a point's coordinates from an object's reference frame to the camera's reference frame.

Subsequently, to provide a realistic rendering, the coordinates are further transformed to provide a perspective simulating perspective distortion and permitting the camera to provide a view that will enable a viewer to judge distances in the simulated view. The perspective distortion may be generated, for example, using the following 4×4 matrix:

$$\begin{bmatrix} 1/\tan\mu & 0 & 0 & 0 \\ 0 & 1/\tan\nu & 0 & 0 \\ 0 & 0 & \frac{B+F}{B-F} & \frac{-2BF}{B-F} \\ 0 & 0 & 1 & 0 \end{bmatrix}$$

where μ is the angle between a line pointing out of the camera along a z-axis and the plane through the camera and the right-hand edge of the screen, ν is the angle between the same line and the plane through the camera and the top edge of the screen, F is a positive number representing the distance of the observer from the front clipping plane, and B is a positive number representing the distance to the back clipping plane. A Z-buffer may be advantageously provided to permit an appropriate visibility determination and to provide an improved depthwise arrangement of coordinate points (e.g. Z-culling).

The above-noted transformation matrices can be multiplied together to get a final transformation matrix to which a vector defining each of point can be multiplied to directly obtain the screen coordinate at which the point must be drawn to provide the desired camera view. The vector is extended to four dimensions using homogenous coordinates:

$$\begin{bmatrix} x' \\ y' \\ z' \\ \omega' \end{bmatrix} = [\text{Perspective } T] \times [\text{Camera } T] \times [\text{Gaming Environment } T] \times \begin{bmatrix} x \\ y \\ z \\ 1 \end{bmatrix}$$

wherein the abbreviation of "T" represents the corresponding transform. The transforms may alternatively be applied in different orders.

In accord with the present concepts a center point of the movable visual elements 200 is calculated at a given point in time by the average of the positions of all points in the set of movable visual elements. For example, the directional vectors of all points comprising the movable visual elements are averaged to yield a center point of such vectors. Alternatively, the present concepts may comprise calculation of an intermediate point between a plurality of selected points, such intermediate point encompassing within a desired point of view predetermined selected points. The aforementioned center point may comprise points defining all movable visual elements 200 or may include only those points defining movable visual elements disposed within a field of view or view volume of the camera at that point in time. The view volumes planes which make up the view volume or view frustrum (i.e., volume defined by 6 planes in space, including front and back planes) are then defined using this center point. In various aspects, the center point serves as a center point of the view frustrum, is maintained near a center point of the view frustrum, or is disposed elsewhere within the view frustrum.

Once the center point and associated center point vector of the movable visual elements 200 is determined, the camera may be transformed via a transformation matrix to this position represented by the vector. Also the movable visual elements 200 (e.g., the moving 3D objects in the gaming environment) may be transformed from their own local coordinate system into a world coordinate system via the transformation matrix that defines the position and orientation of the movable visual elements is the world space. The movable visual elements 200 are also transformed into the camera coordinate system so that their position and orientation are relative to the camera's position and orientation.

The controller is configured to move the camera backwards or forwards along the z-axis, as necessary, to retain all of the desired movable visual elements 200 within the view volume. The camera is thus configured, for example, to translate along a line defined by the center point of the set of objects and a direction vector (e.g., a camera "lookAt" vector). The forward and backward movement of the camera, in particular, permits zooming to focus on a small set of movable visual elements 200 (e.g., one virtual person moving within the gaming environment). The camera also has angle parameters which can also be changed at any time.

Dynamic objects, such as the movable visual elements 200, and static objects, such as the aforementioned game board 178 in the gaming environment, are, further defined by a position in space and a bounding volume (e.g., a bounding sphere, bounding polygon, bounding planes). If any portion of the bounding volume is determined to lie within a viewing volume at a given instant in time, the object can then be designated for rendering, in whole or in part, or, alternatively, the object can, for such instant, be removed from the camera movement algorithm (CMA) (e.g., removed from a CMA watch list).

As noted above, the gaming machine 10 according to the present invention generates 3-D effects in real-time with a 3-D engine, providing a visually-rich environment for the gaming player. In accord with the above concepts, at each time step, the controller controlling the calculations for determination of the appropriate view of the gaming environment from the camera calculates the needed position to capture the desired dynamic elements (e.g., movable visual elements 200) and static elements (e.g., game board 178) in the view frustrum.

The movement of the camera between a point at a first instant of time to encompass a first set of movable visual elements 200 and static elements in the view frustrum and a second instant of time to encompass a second set of movable visual elements 200 and static elements in the view frustrum may advantageously be softened utilizing a linear or non-linear video or motion smoothing function. Any conventional motion smoothing function could be employed to the aforementioned movement of the camera between a first point and a second point. The smoothing function may, for example, provide limits on and/or control acceleration, deceleration, and/or velocity of the camera as it travels between a first point at a first point in time and a second point at a second point in time. Likewise, the smoothing function may provide limits on and/or control rates of angular movement of the camera (e.g., panning, tilting) along one or more axes and/or limits on depthwise movement of the field of view (e.g., focusing) as it travels between a first point at a first point in time and a second point at a second point in time. Conventional smoothing function methods including using curves, exponential decay functions, and damped springs. Curve methods might include using a part of a sine wave as the dampening factor. Common exponential decay functions may use a current position, a desired position, a scalar, and a time delta to derive a new smoothed position. Damped springs used for smoothing may utilize Hooke's law to represent the spring and consider variables of forces, spring lengths, velocities, points of mass, and constants to model the spring.

In accord with the above concepts, the list of the set of movable visual elements 200 may be changed at any time without significant disruption to the view point or view frustrum since the view frustrum is advantageously centered about, or includes, a center point of a selected set (e.g., all, some, etc.) of the movable visual elements 200 calculated at a given point in time by the average of all points (e.g., directional vectors) in the set of movable visual elements. This centering of the view frustrum allows movable visual elements 200 to enter/exit the gaming environment without causing significant jumps in camera movement, as is described above with reference to certain of FIGS. 4-9. For example, when one of the movable visual elements 200 vanishes off of the left side of the game board 178 at the "ST. CHARLES PLACE" station 176, as shown in FIG. 9, the camera, which is positioned to include all of the movable visual elements 200 within the view frustrum, does not require a significant shift in the view point to reorient the view point responsive to the change in the center point of the remaining movable visual elements.

The 3-D views of the gaming environment of the present concepts are displayed in real-time on the display 16. In a real-time determination and display embodiment, game activity is shown on the display 16 at substantially the same time that the underlying mathematical basis for the displayed game activity is being calculated (e.g., "rendering on the fly"). The 3-D, real-time views of the present concepts display at least a portion of the game board 178 from different view points. The view points may be shown at different distances, camera angles, combinations thereof, or the like.

Referring back to FIG. 4, for example, the first view 183 shows a broad, distant view the game board 178 during which the camera is generally aimed in the direction of Arrow A. The second view 185 shows a closer-up or zoomed-in view of an element of the game board 178—PACIFIC AVENUE 192—in which the camera is generally aimed in the direction of Arrow B. Displaying elements of the wagering game from various distances and/or camera angles allows a player to simultaneously maintain a broad view of the game as well as perceive more detail regarding the game activity. Thus, this feature allows for a more realistic, interactive view of the elements and thereby increases the anticipation and excitement experienced by the player.

Although in the illustrated embodiments, the 3-D real-time displays are shown during the bonus game, it is contemplated that the present concepts may also be used during a basic game or both the basic game and a bonus game. Furthermore, although the basic game of the illustrated embodiment is a slot machine game, the present concepts may also be used with other types of wagering games including, for example, video poker, video roulette, video keno, and the like. The gaming environment various views of "elements," as described herein may include symbols, a location of a path, or the like that is used to indicate a randomly-selected outcome.

Although the movable visual elements 200 above related to non-player-controlled virtual people, the movable visual elements may also or alternatively comprise player-controlled elements. Such player-controlled elements may comprise, for example, but are not limited to, game tokens (e.g., MONOPOLY® tokens such as a car, dog, horse, shoe, hat, etc.) moving about the game board 178 or game pieces or player-controlled virtual people moved about a gaming environment.

Each of these embodiments and obvious variations thereof is contemplated as falling within the spirit and scope of the claimed concepts, which is set forth in the following claims. For example, although determination of a center point of the movable visual elements 200 has been disclosed, other vectors may also be advantageously used to control or influence camera movement. A velocity vector of one or more movable visual elements 200 may also be used, in combination with a motion smoothing function, to control movement of the camera between a first point at a first point in time and a second point at a subsequent time. In one aspect, the acceleration and/or velocity of the camera may be set to substantially match the velocity of the movable visible element 200. In yet other aspects, the repositioning of the camera to the second point to provide a second three-dimensional view of one or more movable visual elements from a second view point may precede or follow a movement of the one or more movable visual elements or may occur simultaneously with a movement of the one or more movable visual elements.

Still further, for purposes of calculating a center of the movable visual elements 200 and an associated view frustrum including a desired set of such movable visual elements, the movable visual elements may be assigned varying weights or levels of importance to skew the calculated center in accord with such weighting.

Additionally, since the present concepts are applied to a wagering game where, at some point prior to display of or the revealing of an outcome, all of the outcomes are pre-determined or known to the controller (e.g., 34) in advance, the controller may be advantageously configured to determine, in advance of the display of a particular outcome, an appropriate camera view for one or more subsequent times. For example, a controller 34 may determine the appropriate camera view for a first time (e.g., $T_0$), an immediately subsequent second time (e.g., $T_1$), and indeed, at any and all points in time through completion of a game feature through a last time (e.g., $T_N$). Thus, the controller (e.g., 34) may, using predetermined random outcomes, compute in advance, either prior to a game feature and/or during a game feature, a camera position, set(s) of movable elements 200 and characteristics thereof (e.g., position, directional vectors, movement, etc.) and determine an associated view frustrum, based on selected parameters, for one or more time increments.

What is claimed is:

1. A gaming system comprising:

an input device configured to receive an indication of a wager to play a wagering game;

a display; and a controller configured to direct the display to:

display a three-dimensional field of view of at least a portion of a gaming environment and a plurality of moving visual elements disposed within said gaming environment, dynamically display a subset of said plurality of moving visual elements moving from a first element position to a second element position, the subset comprising two or more of the moving visual elements, dynamically display the three-dimensional field of view moving from a first camera position to a second camera position in a substantially continuous movement, and dynamically retain within said moving field of view a moving center point of said subset of said plurality of moving visual elements while the three-dimensional field of view moves from the first camera position to the second camera position.

2. The gaming system of claim 1, wherein said movement of said field of view comprises moving the field of view between a plurality of pre-determined reference points within the gaming environment.

3. The gaming system of claim 2, wherein each of said pre-determined reference points within the gaming environment provides a different field of view of the gaming environment.

4. The gaming system of claim 1, wherein said movement of said field of view comprises moving the field of view responsive to a change in a position vector of at least one of said moving visual elements.

5. The gaming system of claim 1, wherein said movement of said field of view comprises moving the field of view prior to or concurrent with a change in a position vector of at least one of said moving visual elements.

6. The gaming system of claim 2, wherein at least one of said plurality of pre-determined reference points provides a field of view encompassing substantially the entire gaming environment.

7. The gaming system of claim 1, wherein said center point is calculated by said controller from a set of position vectors of all of said moving visual elements.

8. The gaming system of claim 7, wherein a view point for said moving field of view is positioned to center said moving center point substantially within a center of said moving field of view.

9. The gaming system of claim 1, wherein each of said movable visual elements comprises a player token or a computer-generated element.

10. The gaming system of claim 1, wherein a movement of each of said moving visual elements is rendered on the fly by a game engine.

11. A method of conducting a wagering game on a gaming system with at least one display device and at least one controller, the method comprising:

displaying, via the at least one display device, a view point of a virtual camera positioned at a first point within a three-dimensional gaming environment to provide a first three-dimensional view of multiple movable visual elements in said gaming environment at a first point in time;

randomly determining, via the at least one controller, a respective position of each of said movable visual elements at a second point in time;

dynamically displaying, via the at least one display device, said movable visual elements moving toward said randomly determined positions to arrive at said positions at said second point in time; and dynamically displaying, via the at least one display device, the view point of said virtual camera repositioning to a second view point within said gaming environment in association with movement of the movable visual elements to provide a second three-dimensional view of said movable visual elements preceding, concurrent with, or following the movement of said movable visual elements toward said randomly determined positions, and wherein said repositioning of said view point of said virtual camera to said second view point comprises moving said virtual camera from said first view point to said second view point in a substantially continuous movement while at least substantially maintaining a view of a moving center point of said movable visual elements during said automatic repositioning.

12. The method of claim 11, further comprising, subsequent to said act of randomly determining respective positions of said movable visual elements at a second point in time, determining said second view point within said gaming environment.

13. A method of conducting a wagering game on a gaming system with at least one display device and at least one controller, the method comprising:

displaying, via the at least one display device, a view point of a virtual camera positioned at a first point within a three-dimensional gaming environment to provide a first three-dimensional view of a plurality of movable visual elements in said gaming environment at a first point in time;

randomly determining, via the at least one controller, a respective position of each of said movable visual elements at a second point in time;

dynamically displaying, via the at least one display device, each of said movable visual elements moving toward the respective randomly determined position for that particular movable visual element so that each movable visual element arrives at its respective randomly determined position at said second point in time;

dynamically displaying, via the at least one display device, the view point of said virtual camera repositioning to a second view point within said gaming environment to provide a second three-dimensional view of said plurality of movable visual elements preceding, concurrent with, or following the movement of said plurality of movable visual elements, and determining, via the at least one controller, said second view point within said gaming environment by calculating a position from which said camera can view all of said plurality of movable visual elements at least upon completion of said movement of said plurality of movable visual elements, wherein said repositioning of said view point of said virtual camera to said second view point comprises moving said virtual camera from said first view point to said second view point in a substantially continuous movement while at least substantially maintaining a view of all said plurality of movable visual elements during said automatic repositioning.

14. The method of claim 13, wherein said act of determining said second view point within said gaming environment comprises selecting a view point from a plurality of predetermined camera viewing positions in said gaming environment, from which said virtual camera can view all of said plurality of movable visual elements.

15. The method of claim 12, wherein said act of determining said second view point within said gaming environment comprises selecting a view point from a plurality of predetermined camera viewing positions in said gaming environment, from which said virtual camera can view a plurality of movable visual elements.

16. The method of claim 13, wherein each of said movable visual elements comprises a player's game token or a computer-generated element.

17. The method of claim 11, wherein the act of moving said movable visual elements toward said randomly determined positions comprises rendering on the fly a movement of said movable visual element by a game engine.

18. A computer program product comprising one or more non-transient computer-readable storage media encoded with instructions which, when executed by one or more processors, cause the one or more processors to operate with one or more display devices to:

display a view point of a virtual camera positioned at a first point within a three-dimensional gaming environment to provide a first three-dimensional view of multiple movable visual elements in said gaming environment at a first point in time;

randomly determine a respective position of each of said movable visual elements at a second point in time;

dynamically display said movable visual elements moving toward said randomly determined positions to arrive at said positions at said second point in time; and dynamically display the view point of said virtual camera repositioning to a second view point within said gaming environment in association with movement of the movable visual elements to provide a second three-dimensional view of said movable visual elements preceding, concurrent with, or following the movement of said movable visual elements toward said randomly determined positions, wherein said repositioning of said view point of said virtual camera to said second view point comprises moving said virtual camera from said first view point to said second view point in a substantially continuous movement while at least substantially maintaining a view of a moving center point of said movable visual elements during said automatic repositioning.

19. A gaming system comprising:

an input device configured to receive an indication of a wager to play a wagering game; and at least one display configured to display a three-dimensional gaming environment comprising a path including a plurality of stations and a plurality of moving visual elements moving in relation to said gaming environment toward one of said plurality of stations of said path, the at least one display being adapted to display a three-dimensional view of the gaming environment from a virtual camera positioned at a dynamically selected view point, said dynamically selected view point being determined by a controller to retain within a field of view of said virtual camera view a moving center point of the plurality of moving visual elements while said dynamically selected view point changes in a substantially continuous manner and while the visual elements move toward the one of said plurality of stations.

20. The gaming system of claim 1, wherein each of the moving visual elements in the subset of moving visual elements includes a respective vector with magnitude and directional components, the moving center point being the center of said vectors.

21. The gaming system of claim 1, wherein the moving center point of the subset of moving visual elements is calculated repeatedly at numerous points in time as the average of the positions of all points in the subset of movable visual elements.

22. The gaming system of claim 1, wherein the movements of all of the moving visual elements in the subset of moving visual elements are randomly determined.

23. The gaming system of claim 1, wherein the movement of at least one of the moving visual elements in the subset of moving visual elements affects a randomly determined outcome of the wagering game.

* * * * *

UNITED STATES PATENT AND TRADEMARK OFFICE

CERTIFICATE OF CORRECTION

PATENT NO. : 8,628,415 B2
APPLICATION NO. : 12/513105
DATED : January 14, 2014
INVENTOR(S) : Johnson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1251 days.

Signed and Sealed this
Twenty-second Day of September, 2015

Michelle K. Lee

Michelle K. Lee
*Director of the United States Patent and Trademark Office*